(12) United States Patent
Kobayashi

(10) Patent No.: US 9,554,412 B2
(45) Date of Patent: Jan. 24, 2017

(54) ELECTRONIC DEVICE AND CONTROL DEVICE

(71) Applicant: FUJITSU COMPONENT LIMITED, Tokyo (JP)

(72) Inventor: Mitsuru Kobayashi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 13/938,464

(22) Filed: Jul. 10, 2013

(65) Prior Publication Data

US 2014/0044435 A1 Feb. 13, 2014

(30) Foreign Application Priority Data

Aug. 9, 2012 (JP) ................................. 2012-177391

(51) Int. Cl.
*H04B 10/00* (2013.01)
*H04W 76/02* (2009.01)
*H04W 8/00* (2009.01)

(52) U.S. Cl.
CPC ........... *H04W 76/026* (2013.01); *H04W 8/005* (2013.01)

(58) Field of Classification Search
CPC . H04B 10/1143; H04B 10/11; H04B 10/1149; H04B 10/00; H04B 10/1123; H04B 10/114; H04B 17/00; H04B 5/0031; H04B 5/02; H04B 1/385; H04B 5/0062; H04B 10/116; H04B 10/803; G08C 2201/20; G08C 2201/93; G08C 2201/21; G08C 2201/61; G08C 2201/40; G08C 2201/91; H04M 1/7253; H04M 1/737; H04W 4/008; H04W 12/06; H04W 12/08; H04W 76/023

(Continued)

(56) References Cited

U.S. PATENT DOCUMENTS 8,947,199 B2 * 2/2015 Lucaci .................. H04L 12/282 340/12.22
9,106,337 B2 * 8/2015 Jung .................. H04B 10/1141
(Continued)

FOREIGN PATENT DOCUMENTS

JP 2004-200887 7/2004
JP 2005-303459 10/2005
(Continued)

OTHER PUBLICATIONS

Patent Abstract of Japan, Publication No. 2004-200887, Published Jul. 15, 2004.

(Continued)

*Primary Examiner* — Hibret Woldekidan
(74) *Attorney, Agent, or Firm* — Staas & Halsey LLP

(57) ABSTRACT

A control device includes: an acquisition portion that acquires, from an information processing apparatus, pairing information corresponding to at least one of electronic devices among a plurality of pieces of pairing information corresponding to the respective electronic devices, the pairing information being used in order that the electronic devices connected to each other via a wireless network perform pairing; and an output portion that outputs the pairing information corresponding to the at least one of the electronic devices to the at least one of the electronic devices by using a non-contact system different from the wireless network.

7 Claims, 8 Drawing Sheets

(58) Field of Classification Search
USPC ........ 398/115, 116, 118, 128, 130, 106, 107, 398/112; 370/338
See application file for complete search history.

(56) References Cited

U.S. PATENT DOCUMENTS

| | | | |
|---|---|---|---|
| 9,344,886 B2* | 5/2016 | Nakajima | H04W 12/06 |
| 2003/0013440 A1* | 1/2003 | Takatori | H04L 12/12 |
| | | | 455/422.1 |
| 2004/0071471 A1* | 4/2004 | Baker | H04B 10/1143 |
| | | | 398/140 |
| 2005/0188062 A1* | 8/2005 | Li | H04W 8/005 |
| | | | 709/220 |
| 2005/0278462 A1* | 12/2005 | Gillespie | H04N 21/43637 |
| | | | 710/8 |
| 2006/0120531 A1* | 6/2006 | Semple | H04L 9/3271 |
| | | | 380/270 |
| 2007/0097878 A1* | 5/2007 | Morioka | H04W 12/06 |
| | | | 370/254 |
| 2008/0031210 A1* | 2/2008 | Abhishek | H04W 8/005 |
| | | | 370/338 |
| 2009/0033513 A1* | 2/2009 | Salsbury | H04W 24/00 |
| | | | 340/4.2 |
| 2010/0329689 A1* | 12/2010 | Sin | G08C 17/02 |
| | | | 398/115 |
| 2011/0191237 A1* | 8/2011 | Faith | G06F 1/1694 |
| | | | 705/39 |
| 2012/0210172 A1* | 8/2012 | Gara | G06F 11/1641 |
| | | | 714/37 |
| 2013/0139218 A1* | 5/2013 | Roulland | G06F 21/42 |
| | | | 726/3 |
| 2014/0255025 A1* | 9/2014 | King | G06F 13/385 |
| | | | 398/25 |
| 2015/0358817 A1* | 12/2015 | Falk | H04W 12/06 |
| | | | 726/3 |
| 2015/0372754 A1* | 12/2015 | Choi | H04B 10/116 |
| | | | 398/130 |

FOREIGN PATENT DOCUMENTS

| | | |
|---|---|---|
| JP | 2006-526933 | 11/2006 |
| JP | 2008-153911 | 7/2008 |
| WO | 2004/109982 | 12/2004 |
| WO | 2009/150492 | 12/2009 |
| WO | 2012/063187 | 5/2012 |

OTHER PUBLICATIONS

Japanese Office Action issued Mar. 15, 2016 in corresponding Japanese Patent Application No. 2012-177391, 5 pages.
Extended European Search Report issued Jun. 1, 2016 in corresponding European Patent Application No. 13178226.0, 7 pages.

* cited by examiner

US 9,554,412 B2

ELECTRONIC DEVICE AND CONTROL DEVICE

CROSS-REFERENCE TO RELATED APPLICATION

This application is based upon and claims the benefit of priority of the prior Japanese Patent Application No. 2012-177391 filed on Aug. 9, 2012, the entire contents of which are incorporated herein by reference.

FIELD

A certain aspect of the embodiments is related to an electronic device and a control device, e.g., to an electronic device that is connected to another electronic device by a wireless network and a control device that controls the electronic device.

BACKGROUND

Electronic devices which are connected to each other by a wireless network, such as a wireless LAN (Local Area Network) and ZigBee, are used. Since the electronic devices can transmit and receive data via the wireless network, cables for transmitting and receiving the data are not needed. Movement of the electronic devices is easy. In order to connect the electronic devices to the wireless network, pairing, such as sharing of a secret key for encryption and/or setting of addresses, is performed between the electronic devices. For the pairing, pairing information including addresses is delivered between the electronic devices. Performing delivery of the pairing information between the electronic devices through a remote control is known. Infrared data communication is used for transmission and reception of the pairing information between the remote control and the electronic device (e.g. see Japanese National Publication of International Patent Application No. 2006-526933 and Japanese Laid-open Patent Publication No. 2004-200887).

SUMMARY

According to an aspect of the present invention, there is provided a control device including: an acquisition portion that acquires, from an information processing apparatus, pairing information corresponding to at least one of electronic devices among from a plurality of pieces of pairing information corresponding to the respective electronic devices, the pairing information being used in order that the electronic devices connected to each other via a wireless network perform pairing; and an output portion that outputs the pairing information corresponding to the at least one of the electronic devices to the at least one of the electronic devices by using a non-contact system different from the wireless network.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
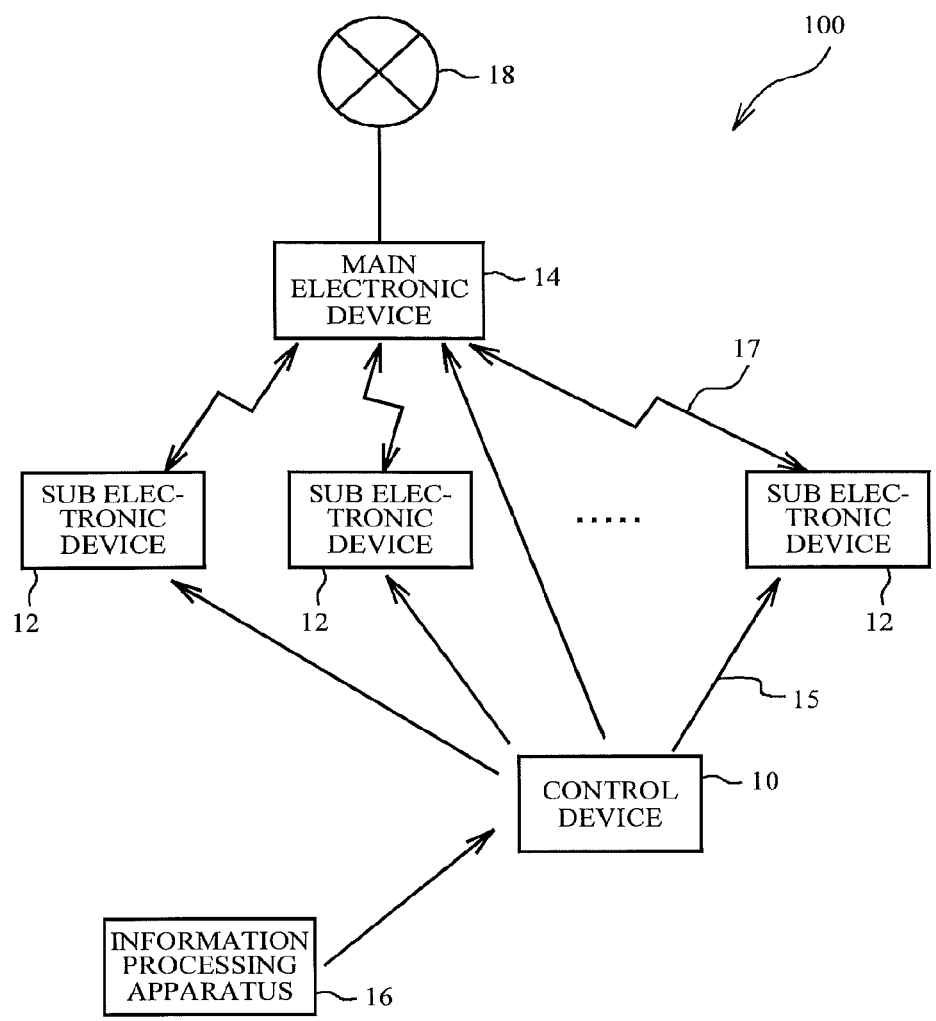
FIG. 1 is a block diagram illustrating a system including electronic devices and a control device according to a first embodiment.

Hereinafter, a description will be given of embodiments of the present invention with reference to the drawings.
First Embodiment FIG. 1 is a block diagram illustrating a system including electronic devices and a control device according to a first embodiment. As illustrated in FIG. 1, a system 100 includes a control device 10, sub electronic devices 12, a main electronic device 14, and an information processing apparatus 16. The main electronic device 14 and the sub electronic devices 12 are connected to each other via a wireless network 17. Thus, a plurality of electronic devices are connected to each other via the wireless network. The main electronic device 14 is connected to an external network 18 such as Ethernet. The wireless network 17 is a wireless LAN (Local Area Network) (e.g. IEEE802.11) or a ZigBee.

The control device 10 outputs the pairing information to the main electronic device 14 and the sub electronic devices 12 by using a non-contact system 15 which is a system different from the wireless network 17. The non-contact system 15 is an infrared data communication system, such as IrDA (Infrared Data Association), or a wireless system, such as RFID (Radio Frequency Identification), for example.

The information processing apparatus 16 is a personal computer, a mobile phone, a smart phone or the like. An exclusive application is installed in the information processing apparatus 16, and sets the pairing information on each of the electronic devices 12 and 14. The pairing information is information for setting connection as a network between the electronic devices 12 and 14, and includes addresses, passwords, and/or a radio channel of each of the electronic devices 12 and 14.

The sub electronic device 12 is a power strip, for example. The sub electronic device 12 measures power consumption, and transmits power supply information including the measured power consumption to the main electronic device 14 via the wireless network 17. The main electronic device 14 is a management device for each power strip, for example. The main electronic device 14 manages power supply information of each power strip, and transmits and receives information to/from an external device via the network 18. The power strip is often installed in a place that does not usually stand out, such as a place under a desk or under a roof. The main electronic device 14 transmits and receives the information to/from the sub electronic devices 12 via the wireless network 17, so that the power supply information can be easily managed.

Figure 2:
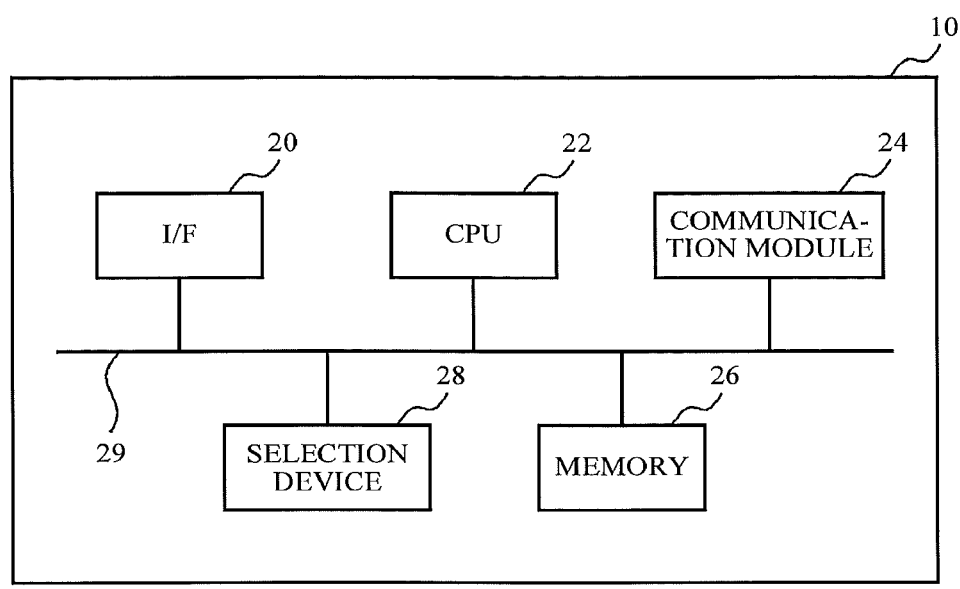
FIG. 2 is a block diagram of the control device.

FIG. 2 is a block diagram of the control device. As illustrated in FIG. 2, the control device 10 includes an interface (I/F) 20, a CPU (Central Processing Unit) 22, a communication module 24, a memory 26, a selection device 28, and a bus 29. The interface 20 acquires the pairing information from the information processing apparatus 16. The CPU 22 controls the interface 20, the communication module 24, the memory 26, and the selection device 28 via the bus 29. The communication module 24 outputs the pairing information to the electronic devices 12 and 14. The memory 26 stores the pairing information corresponding to each of the electronic devices 12 and 14. The selection device 28 selects at least one of the electronic devices 12 and 14 to which the pairing information is output.

Figure 3:
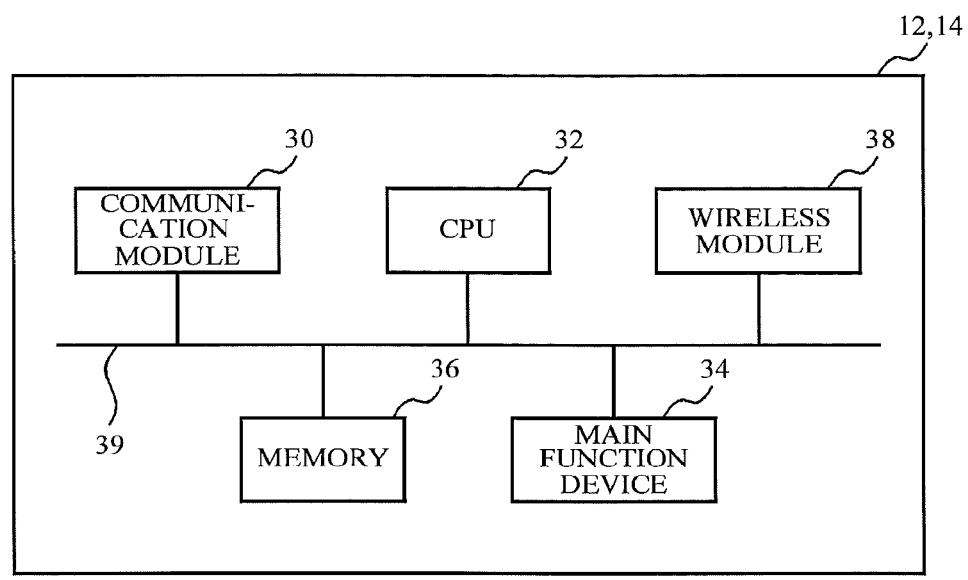
FIG. 3 is a block diagram of the electronic device.

FIG. 3 is a block diagram of the electronic devices 12, 14. As illustrated in FIG. 3, each of the electronic devices 12 and 14 includes a communication module 30, a CPU 32, a memory 36, a main function device 34, and a wireless module 38. The communication module 30 acquires the pairing information from the control device 10. The CPU 32 controls the communication module 30, the memory 36, the main function device 34, and the wireless module 38 via a bus 39. The memory 36 stores the pairing information and so on. The main function device 34 performs main functions of the electronic device. When an electronic device is the sub electronic device 12, for example, the main function device 34 is a power strip. When an electronic device is the main electronic device 14, the main function device 34 is a computer that manages the power supply information.

Figure 4:
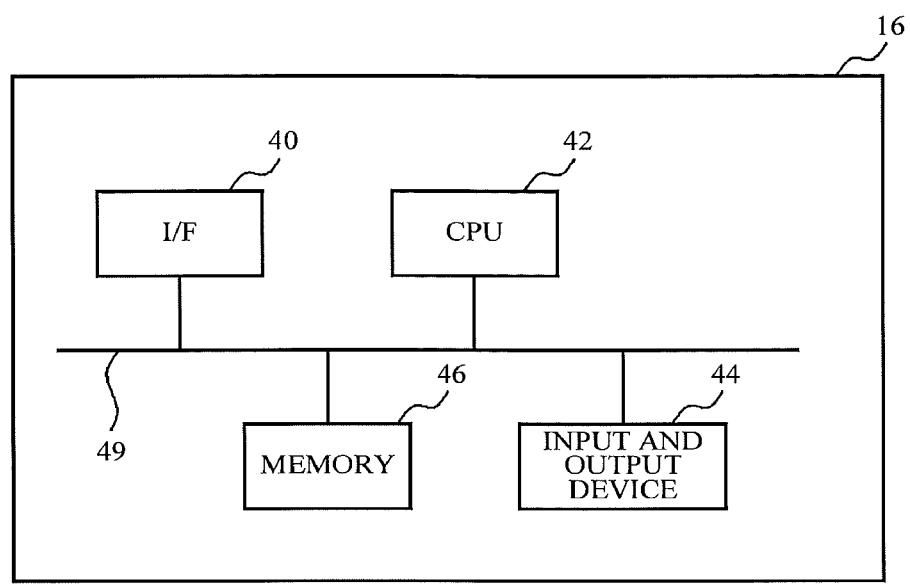
FIG. 4 is a block diagram of an information processing apparatus.

FIG. 4 is a block diagram of the information processing apparatus 16. As illustrated in FIG. 4, the information processing apparatus 16 includes an interface (I/F) 40, a CPU 42, a memory 46, and an input and output device 44. The interface 40 outputs the pairing information to the control device 10. The CPU 42 controls the interface 40, the CPU 42, the memory 46, and the input and output device 44 via a bus 49. The memory 46 stores the pairing information corresponding to each of the electronic devices 12 and 14.

Each of the interface 20 of the control device 10 and the interface 40 of the information processing apparatus 16 is a reader and writer for RFID (Radio Frequency IDentification), an IrDA (Infrared Data Association) transmitting and receiving device, an interface for RS232C or USB (Universal Serial Bus), or a reader and writer for a SD (Secure Digital) card or CF (Compact Flash) storage card, for example. Thus, a wireless system such as the IrDA or the RFID, a wire system such as the RS232C or the USB, or a storage medium such as the SD card or the CF card can be used for the transmission of the pairing information from the information processing apparatus 16 to the control device 10.

Figure 5:
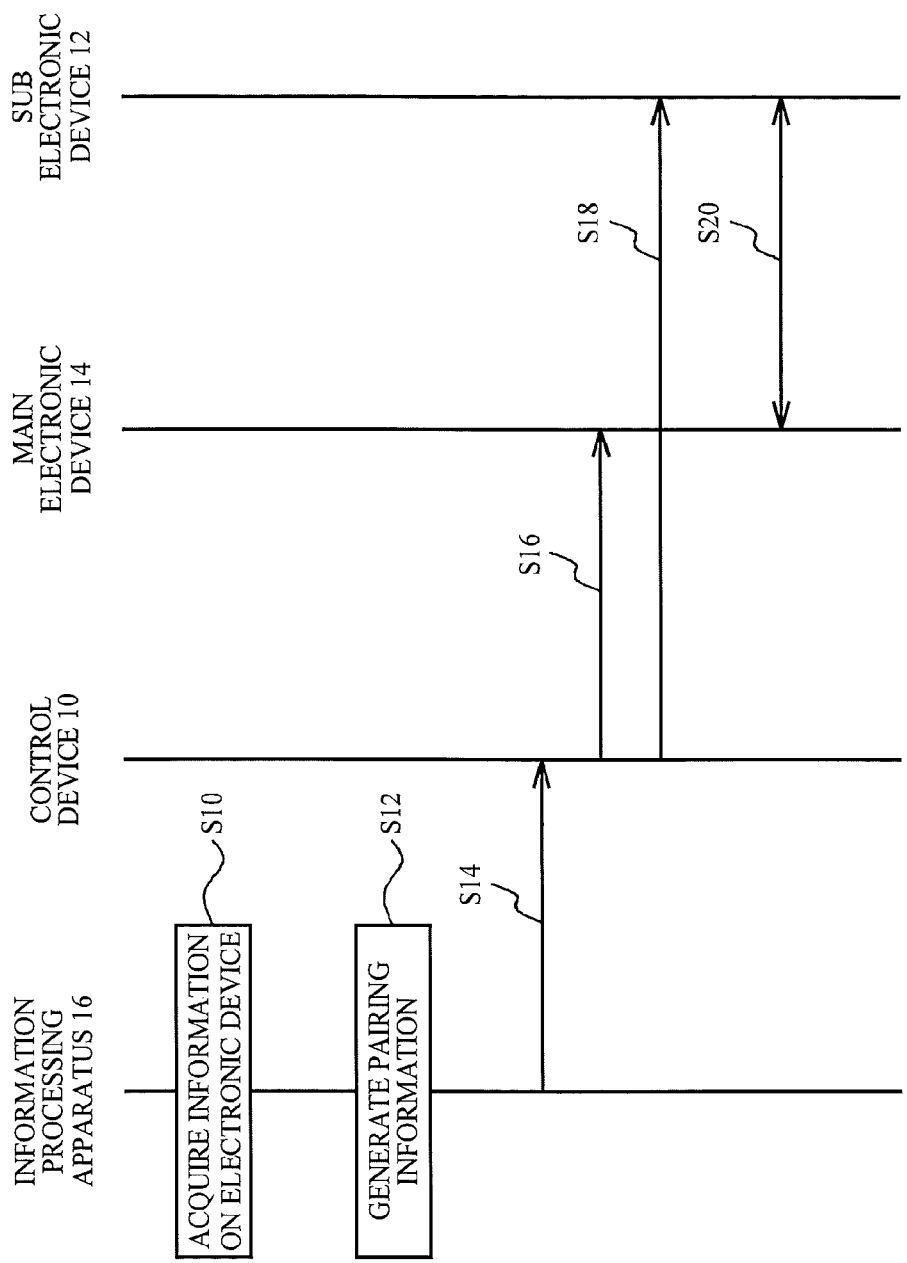
FIG. 5 is a sequence diagram of each device.

FIG. 5 is a sequence diagram of each device. As illustrated in FIG. 5, the information processing apparatus 16 acquires information on the electronic devices 12 and 14 (step S10). The information on the electronic devices 12 and 14 is acquired from the control device 10 via the interface 40 or the input and output device 44, for example. Next, the information processing apparatus 16 generates a plurality of pieces of pairing information corresponding to the electronic devices 12 and 14 based on the information on the electronic devices 12 and 14 (step S12). The plurality of pieces of generated pairing information are stored into the memory 46. When the wireless network 17 is first built, for example, the information processing apparatus 16 generates the plurality of pieces of pairing information corresponding to all of the electronic devices 12 and 14. When the sub electronic device 12 is newly added to wireless network 17, the information processing apparatus 16 generates pairing information corresponding to the sub electronic device 12 to be newly added.

Next, the interface 40 of the information processing apparatus 16 transmits the pairing information to the interface 20 of the control device 10 (step S14). The communication module 24 of the control device 10 transmits the pairing information to the main electronic device 14 (step S16). For example, the communication module 24 of the control device 10 transmits the pairing information on the sub electronic device 12 to the main electronic device 14. Next, the communication module 24 of the control device 10 transmits the pairing information to the sub electronic device 12 (step S18). For example, the communication module 24 of the control device 10 transmits the pairing information on the main electronic device 14 to the sub electronic device 12. Thereby, the pairing between the main electronic device 14 and the sub electronic device 12 is completed. Then, the main electronic device 14 and the sub electronic device 12 communicate with each other via the wireless network 17 by using the wireless module 38 (step S20).

Figure 6:
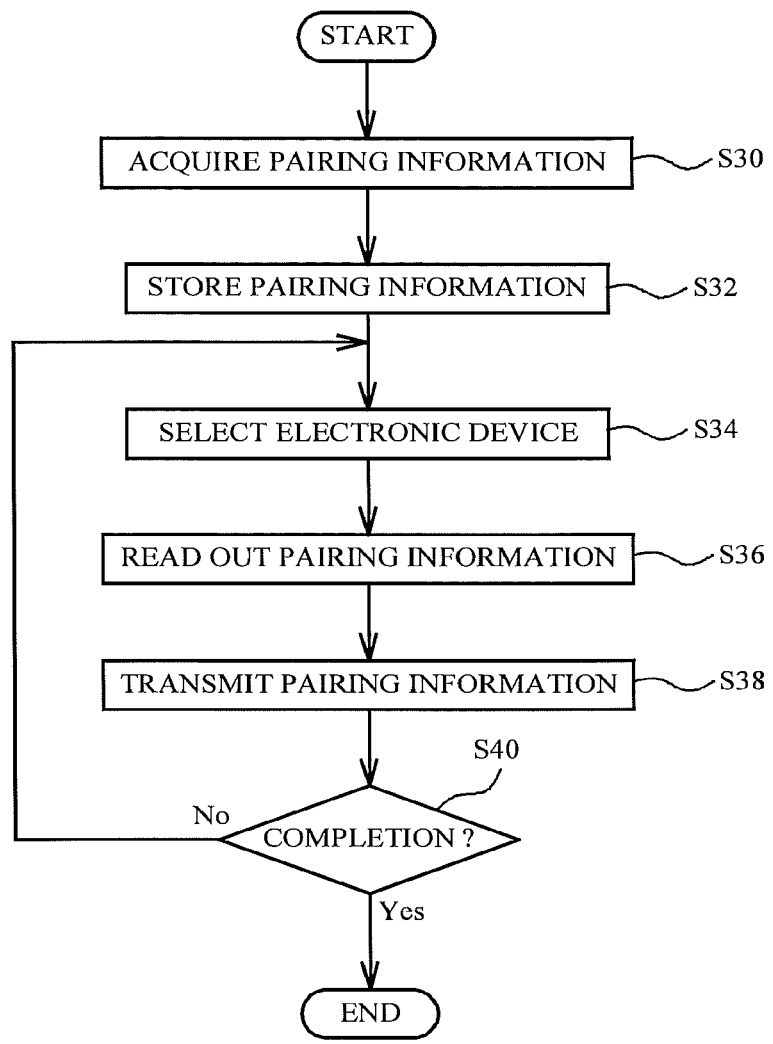
FIG. 6 is a flowchart illustrating a process of the control device.

FIG. 6 is a flowchart illustrating a process of the control device. As illustrated in FIG. 6, the CPU 22 causes the interface 20 to acquire the pairing information from the information processing apparatus 16 (step S30). The CPU 22 associates the pairing information with the electronic devices 12 and 14, and stores the associated pairing information into the memory 26 (step S32). The CPU 22 receives information on the electronic device 12 or 14 for transmitting the pairing information, from the selection device 28. The selection device 28 is a selection button, a touch panel, or a selection dial, for example. A user moves the control device 10 in the vicinity of the electronic device 12 or 14. The user selects the electronic device 12 or 14 for transmitting the pairing information by using the selection device 28 (step S34). The selection device 28 may automatically select the electronic device.

The CPU 22 reads out the pairing information corresponding to the selected electronic device 12 or 14 from the memory 26 (step S36). The CPU 22 causes the communication module 24 to transmit the pairing information to the selected electronic device 12 or 14 (step S38). The CPU 22 judges whether the transmission of the pairing information on all of the electronic device 12 or 14 which performs the pairing has been completed (step S40). When the answer to the judgment is YES, the process is terminated. When the answer to the judgment is NO, the process proceeds to step S32.

For example, when the wireless network 17 is first built, for example, the control device 10 transmits the pairing information on the main electronic device 14 to all of the sub electronic devices 12. The control device 10 transmits the pairing information on all of the sub electronic devices 12 to the main electronic device 14. When the sub electronic device 12 is newly added to wireless network 17, the control device 10 transmits the pairing information corresponding to the sub electronic device 12 to be newly added, to the main electronic device 14. The control device 10 transmits the pairing information on the main electronic device 14 to the sub electronic device 12 to be newly added. For example, when the main electronic device 14 includes the pairing information corresponding to the sub electronic device 12 in advance, the control device 10 does not transmit the pairing information corresponding to the sub electronic device 12 to the main electronic device 14, but transmits the pairing information on the main electronic device 14 to the sub electronic device 12. In this case, step S16 of FIG. 5 is omitted. For example, when the sub electronic device 12 includes the pairing information corresponding to the main electronic device 14 in advance, the control device 10 does not transmit the pairing information corresponding to the main electronic device 14 to the sub electronic device 12, but transmits the pairing information on the sub electronic device 12 to the main electronic device 14. In this case, step S18 of FIG. 5 is omitted.

According to the first embodiment, as illustrated in step S30 of FIG. 6, the interface 20 of the control device 10 (an acquisition portion) acquires, from the information processing apparatus, the pairing information corresponding to at least one of the electronic devices 12 and 14 among from the plurality of pieces of pairing information corresponding to the respective electronic devices 12 and 14. The communication module 24 (an output portion) outputs the pairing information corresponding to the at least one of the electronic devices 12 and 14 to the at least one of the electronic devices 12 and 14 by using the non-contact system 15 different from the wireless network 17. Thereby, the main electronic device 14 does not need to generate the pairing information. Therefore, logic and memories for generating the pairing information can be reduced. The wireless module 30 of the main electronic device 14 does not need to transmit information to the control device 10. Therefore, the main electronic device 14 does not need to use a transmission unit, for example. Thus, the main electronic device 14 can be downsized.

Second Embodiment

Figure 7:
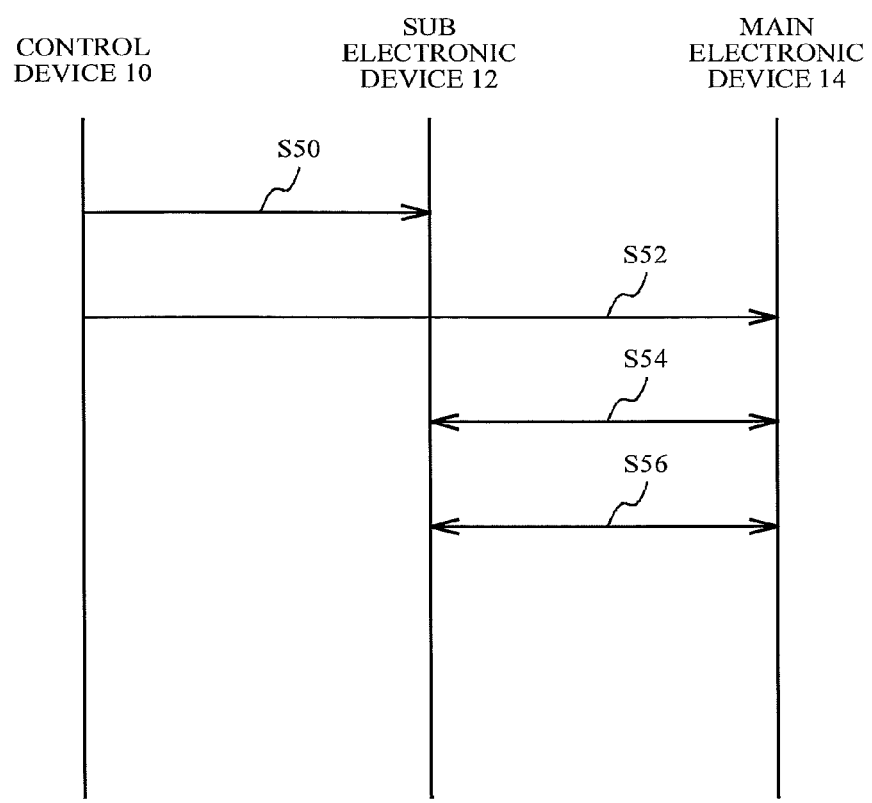
FIG. 7 is a sequence diagram of each device according to a second embodiment.

The block diagrams of the system and each device according to a second embodiment are the same as those of the first embodiment, and hence a description thereof is omitted. Here, the system of the second embodiment does not need to be provided with the information processing apparatus 16. The control unit 10 does not need to be provided with the interface 20. FIG. 7 is a sequence diagram of each device according to the second embodiment. As illustrated in FIG. 7, the communication module 24 of the control device 10 transmits a trigger signal to the sub electronic device 12 (step S50). The communication module 24 of the control device 10 transmits a trigger signal to the main electronic device 14 (step S52). When the main electronic device 14 and the sub electronic device 12 receive the trigger signals, respectively, the main electronic device 14 and the sub electronic device 12 perform the pairing (step S54). When the pairing is completed, the main electronic device 14 and the sub electronic device 12 communicate with each other via the wireless network 17 (step S56).

Figure 8:
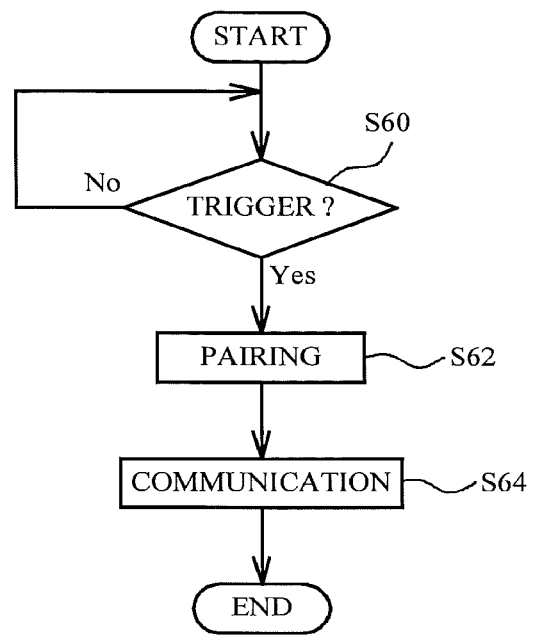
FIG. 8 is a flowchart illustrating a process of the electronic device.

FIG. 8 is a flowchart illustrating a process of the electronic devices 12, 14. As illustrated in FIG. 8, the CPU 32 in the electronic device judges whether the communication module 30 has received the trigger signal from the control device 10 (step S60). When the answer to the judgment is NO, the process returns to step S60. When the answer to the judgment is YES, the CPU 32 performs the pairing with another electronic device (e.g. the main electronic device) to be paired (step S62). The pairing is performed using the wireless network 17, for example. Then, the CPU 32 communicates with the another electronic device via the wireless module 38 (step S64).

According to the second embodiment, as illustrated in steps S50 and S52 of FIG. 7, the communication module 24 of the control device 10 outputs the trigger signal for beginning the pairing to at least one of the electronic devices. The communication module 30 (a receiving portion) of the electronic device 12 or 14 receives the trigger signal from the control device 10. When the CPU 32 (a pairing portion) has received the trigger signal, the CPU 32 begins the pairing with another electronic device. The trigger signal is outputted by using the non-contact system 15 which is a system different from the infrared data communication system such as IrDA, or the wireless network 17 such as RFID. Thereby, the user does not need to go to the electronic device in order to depress the button for the pairing. Therefore, even when the power strip is attached to an inconspicuous place such as a place under the roof, the pairing can be performed easily.

In the first and the second embodiments, the power strip is explained as the sub electronic device 12, and the management device of the power supply information is explained as the main electronic device 14. Each of the main electronic device 14 and the sub electronic device 12 may be an electronic device connected via a wireless network system for performing the pairing. Although an example of a star-type network using the main electronic device 14 and the sub electronic devices 12 is explained as the wireless network 17, another network system may be used. Moreover, the number of each of electronic devices 14 and 12 may be two or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A control device for controlling a communication between other electronic devices via a first non-contact communication system, the control device comprising:
   an acquirer that acquires pairing information for setting a connection between two other electronic devices corresponding to two of the other electronic devices to be paired for communicating with each other from a plurality of pieces of pairing information corresponding to a plurality of electronic devices; and
   an outputter that outputs the pairing information to the two other electronic devices by using a second non-contact communication system that is different from the first non-contact communication system,
   the pairing information being used by the two other electronic devices to be connected to each other via the first non-contact communication system to perform pairing between each other, and
   wherein the control device causes the two other electronic devices to perform the pairing by only outputting the pairing information to the two other electronic devices without receiving data from the two other electronic devices.

2. The control device as claimed in claim 1, wherein the second non-contact communication system is an infrared data communication system.

3. The control device as claimed in claim 1, further comprising:
   a selector that selects the two other electronic devices to which the pairing information is transmitted, from the plurality of electronic devices.

4. The control device as claimed in claim 1, wherein the acquirer acquires the paring information from an information processing apparatus that is different from the two other electronic devices to be paired.

5. The control device as claimed in claim 4, wherein the acquirer acquires the pairing information from the information processing apparatus by using any one of a wireless system, a wire system and a storage medium.

6. A control device for controlling a communication between other electronic devices via a first non-contact communication system, the control device comprising:
  an acquirer that acquires pairing information for setting a connection between two other electronic devices corresponding to two of the other electronic devices to be paired for communicating with each other from a plurality of pieces of pairing information corresponding to a plurality of electronic devices, the plurality of pieces of pairing information being included in an information processing apparatus different from the two other electronic devices and the control device; and
  an outputter that outputs the pairing information to the two other electronic devices by using a second non-contact communication system that is different from the first non-contact communication system,
  the pairing information being used by the two other electronic devices to be connected to each other via the first non-contact communication system to perform pairing between each other, and
  wherein the control device causes the two other electronic devices to perform the pairing by only outputting the pairing information to the two other electronic devices without receiving data from the two other electronic devices.

7. The control device as claimed in claim 6, wherein
  the pairing information is not transmitted and received between the two other electronic devices.

* * * * *